US012683982B2

(12) United States Patent
Searl et al.

(10) Patent No.: US 12,683,982 B2
(45) Date of Patent: Jul. 14, 2026

(54) SYSTEM AND METHOD FOR DETECTING SYNTHETIC ACTIVITY IN A NETWORK VIA USE OF INTERACTIVE ARTIFICIAL INTELLIGENCE

(71) Applicant: BANK OF AMERICA CORPORATION, Charlotte, NC (US)

(72) Inventors: Cody Dean Searl, Indian Land, SC (US); Sanjay Arjun Lohar, Charlotte, NC (US); Kyle Mayers, Charlotte, NC (US); Karen Stanek McFeeters, York, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 350 days.

(21) Appl. No.: 18/143,289

(22) Filed: May 4, 2023

(65) Prior Publication Data

US 2024/0372877 A1 Nov. 7, 2024

(51) Int. Cl.
| | |
|---|---|
| *H04L 9/08* | (2006.01) |
| *H04L 9/32* | (2006.01) |
| *H04L 9/40* | (2022.01) |

(52) U.S. Cl.
CPC ................................ H04L 63/1416 (2013.01)

(58) Field of Classification Search
CPC ......................... H04L 63/1416; H04L 63/1491
USPC ......................................................... 726/23
See application file for complete search history.

(56) References Cited

U.S. PATENT DOCUMENTS

| | | | | |
|---|---|---|---|---|
| 10,270,808 B1* | 4/2019 | Sherif | .................. | G06Q 50/265 |
| 10,855,722 B1* | 12/2020 | Vadlamani | .......... | H04L 63/1408 |
| 10,986,129 B1* | 4/2021 | Sellers | ................ | H04L 63/1491 |
| 2012/0303487 A1* | 11/2012 | Lonstein | ................ | G06Q 30/06 |
| | | | | 705/27.1 |
| 2013/0125239 A1* | 5/2013 | McHugh | ................ | H04L 63/14 |
| | | | | 726/25 |
| 2013/0198819 A1* | 8/2013 | Gordon | .................. | G06F 21/45 |
| | | | | 726/5 |
| 2016/0119377 A1* | 4/2016 | Goldberg | ........... | H04L 63/1408 |
| | | | | 726/12 |

(Continued)

*Primary Examiner* — Taghi T Arani
*Assistant Examiner* — Pegah Barzegar
(74) *Attorney, Agent, or Firm* — Moore & Van Allen PLLC; Nicholas C. Russell

(57) ABSTRACT

Systems, computer program products, and methods are described herein for detecting synthetic activity in a network via use of interactive artificial intelligence are provided. The method includes receiving a first account communication from an end-point device. The first account communication is associated with a user. The method also includes causing a transmission of a first reply communication based on the first account communication to be provided to the end-point device. The method further includes receiving a second account communication. The method still further includes determining a synthetic likelihood value based on the first account communication and/or the second account communication. The synthetic likelihood value indicates the likelihood that the first account communication and/or second account communication are synthetic. The method also includes causing a restriction in access to one or more accounts associated with the user in an instance in which the synthetic likelihood value is above a synthetic threshold.

10 Claims, 5 Drawing Sheets

(56)                    References Cited

U.S. PATENT DOCUMENTS

| | | | | |
|---|---|---|---|---|
| 2018/0324213 | A1* | 11/2018 | Borlick | G06Q 20/227 |
| 2022/0201038 | A1* | 6/2022 | Sellers | H04L 63/1416 |
| 2023/0259631 | A1* | 8/2023 | Zawadzki | G06N 3/0464 |
| | | | | 726/22 |
| 2023/0275911 | A1* | 8/2023 | Park | H04L 63/1433 |
| | | | | 726/23 |
| 2024/0046397 | A1* | 2/2024 | McCurry | G06F 21/6245 |
| 2024/0333765 | A1* | 10/2024 | McGrew | G06F 16/334 |
| 2024/0372877 | A1* | 11/2024 | Searl | H04L 63/1491 |

* cited by examiner

140

156

I/O Device

162 Audio Codec

164 Control Interface

166 Display Interface

152 Processor

154 Memory

158 Communication Interfaces

170 Receiver

160 Transceiver

168 External Interface

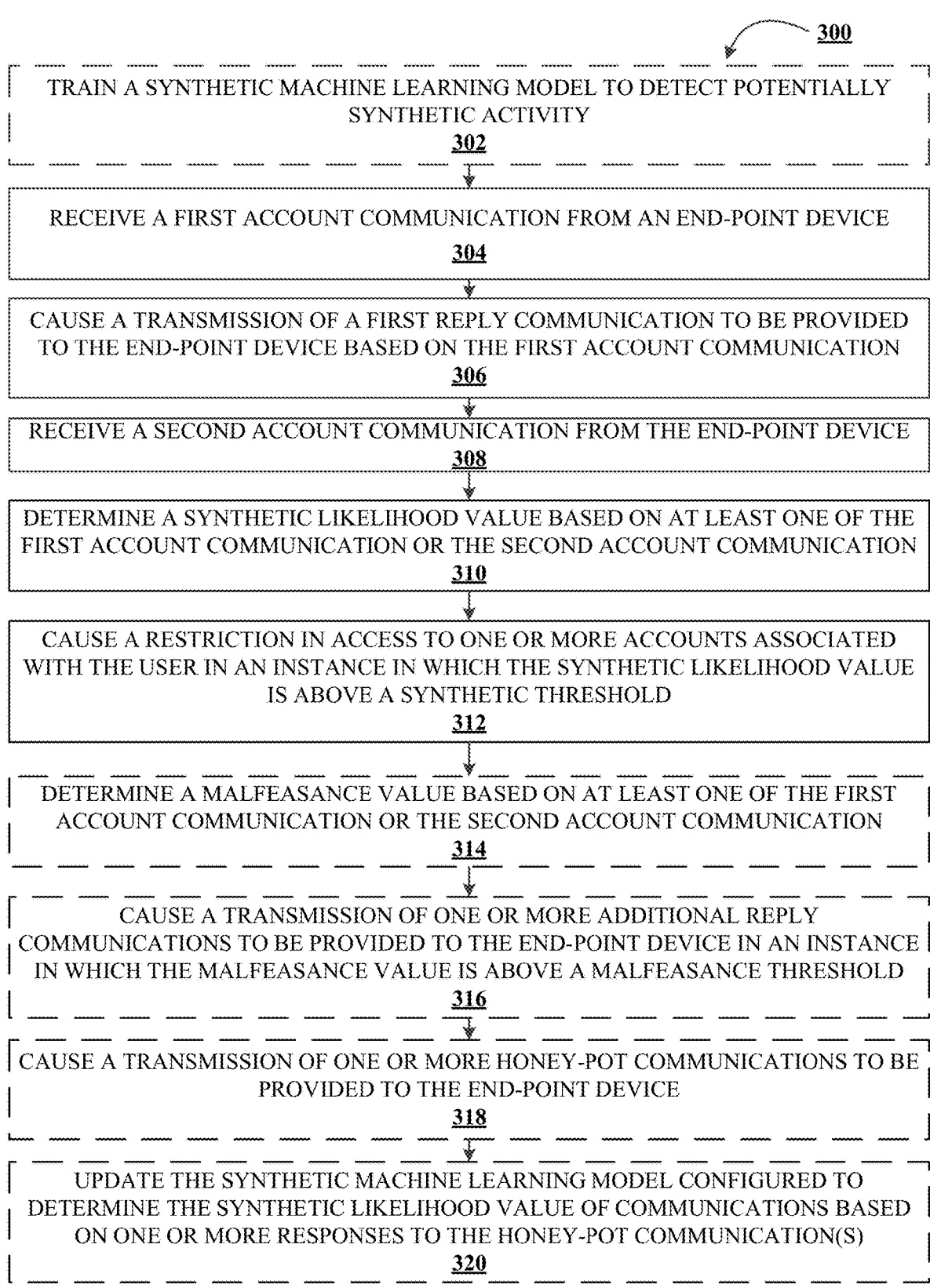

300

TRAIN A SYNTHETIC MACHINE LEARNING MODEL TO DETECT POTENTIALLY SYNTHETIC ACTIVITY
302

RECEIVE A FIRST ACCOUNT COMMUNICATION FROM AN END-POINT DEVICE
304

CAUSE A TRANSMISSION OF A FIRST REPLY COMMUNICATION TO BE PROVIDED TO THE END-POINT DEVICE BASED ON THE FIRST ACCOUNT COMMUNICATION
306

RECEIVE A SECOND ACCOUNT COMMUNICATION FROM THE END-POINT DEVICE
308

DETERMINE A SYNTHETIC LIKELIHOOD VALUE BASED ON AT LEAST ONE OF THE FIRST ACCOUNT COMMUNICATION OR THE SECOND ACCOUNT COMMUNICATION
310

CAUSE A RESTRICTION IN ACCESS TO ONE OR MORE ACCOUNTS ASSOCIATED WITH THE USER IN AN INSTANCE IN WHICH THE SYNTHETIC LIKELIHOOD VALUE IS ABOVE A SYNTHETIC THRESHOLD
312

DETERMINE A MALFEASANCE VALUE BASED ON AT LEAST ONE OF THE FIRST ACCOUNT COMMUNICATION OR THE SECOND ACCOUNT COMMUNICATION
314

CAUSE A TRANSMISSION OF ONE OR MORE ADDITIONAL REPLY COMMUNICATIONS TO BE PROVIDED TO THE END-POINT DEVICE IN AN INSTANCE IN WHICH THE MALFEASANCE VALUE IS ABOVE A MALFEASANCE THRESHOLD
316

CAUSE A TRANSMISSION OF ONE OR MORE HONEY-POT COMMUNICATIONS TO BE PROVIDED TO THE END-POINT DEVICE
318

UPDATE THE SYNTHETIC MACHINE LEARNING MODEL CONFIGURED TO DETERMINE THE SYNTHETIC LIKELIHOOD VALUE OF COMMUNICATIONS BASED ON ONE OR MORE RESPONSES TO THE HONEY-POT COMMUNICATION(S)
320

FIGURE 3

SYSTEM AND METHOD FOR DETECTING SYNTHETIC ACTIVITY IN A NETWORK VIA USE OF INTERACTIVE ARTIFICIAL INTELLIGENCE

TECHNOLOGICAL FIELD

Example embodiments of the present disclosure relate generally to detecting synthetic activity and, more particularly, to detecting synthetic activity in a network via use of interactive artificial intelligence.

BACKGROUND

Synthetic voices and chats have become harder to differentiate from a real person as technology has improved. As such, the security of verbal and textual conversations has been reduced due to synthetic activity mimicking humans for malfeasant purposes. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for detecting synthetic activity in a network via use of interactive artificial intelligence is provided. The system includes at least one non-transitory storage device containing instructions and at least one processing device coupled to the at least one non-transitory storage device. The at least one processing device, upon execution of the instructions, is configured to receive a first account communication from an end-point device. The first account communication is associated with a user. The at least one processing device, upon execution of the instructions, is also configured to cause a transmission of a first reply communication to be provided to the end-point device based on the first account communication. The at least one processing device, upon execution of the instructions, is further configured to receive a second account communication from the end-point device. The at least one processing device, upon execution of the instructions, is still further configured to determine a synthetic likelihood value based on at least one of the first account communication or the second account communication. The synthetic likelihood value indicates the likelihood that at least one of the first account communication or second account communication are synthetic. The at least one processing device, upon execution of the instructions, is also configured to cause a restriction in access to one or more accounts associated with the user in an instance in which the synthetic likelihood value is above a synthetic threshold.

In various embodiments, the at least one processing device, upon execution of the instructions, is configured to determine a malfeasance value based on at least one of the first account communication or the second account communication with the malfeasance value indicating the likelihood that at least one of the first account communication or the second account communication are being received from a malfeasant actor; and cause a transmission of one or more additional reply communications to be provided to the end-point device in an instance in which the malfeasance value is above a malfeasance threshold with each of the one or more additional reply communications including a request for information relating to the user.

In various embodiments, the malfeasance value is determined based on a comparison of known user information to user information provided in at least one of the first account communication or the second account communication.

In various embodiments, the at least one processing device, upon execution of the instructions, is configured to cause a transmission of one or more honey-pot communications to be provided to the end-point device with the one or more honey-pot communications being requests for information relating to at least one of the end-point device or the user associated with the end-point device. In various embodiments, the at least one processing device, upon execution of the instructions, is configured to update a synthetic machine learning model configured to determine the synthetic likelihood value of communications based on one or more responses to the one or more honey-pot communications.

In various embodiments, the at least one processing device, upon execution of the instructions, is configured to cause one or more additional security actions to be required to access the one or more accounts associated with the user in an instance in which the synthetic likelihood value is above a synthetic threshold. In various embodiments, the first reply communication is generated using artificial intelligence based on the first account communication.

In another example embodiment, a computer program product for detecting synthetic activity in a network via use of interactive artificial intelligence is provided. The computer program product includes at least one non-transitory computer-readable medium having computer-readable program code portions embodied therein. The computer-readable program code portions include an executable portion configured to receive a first account communication from an end-point device. The first account communication is associated with a user. The computer-readable program code portions also include an executable portion configured to cause a transmission of a first reply communication based on the first account communication to be provided to the end-point device. The computer-readable program code portions further include an executable portion configured to receive a second account communication from the end-point device. The computer-readable program code portions still further include an executable portion configured to determine a synthetic likelihood value based on at least one of the first account communication or the second account communication. The synthetic likelihood value indicates the likelihood that at least one of the first account communication or second account communication are synthetic. The computer-readable program code portions also include an executable portion configured to cause a restriction in access to one or more accounts associated with the user in an instance in which the synthetic likelihood value is above a synthetic threshold.

In various embodiments, the computer-readable program code portions include an executable portion configured to determine a malfeasance value based on at least one of the first account communication or the second account communication with the malfeasance value indicating the likelihood that at least one of the first account communication or the second account communication are being received from a malfeasant actor; and an executable portion configured to cause a transmission of one or more additional reply communications to be provided to the end-point device in an instance in which the malfeasance value is above a malfeasance threshold with each of the one or more additional reply communications including a request for information relating to the user.

In various embodiments, the malfeasance value is determined based on a comparison of known user information to user information provided in at least one of the first account communication or the second account communication.

In various embodiments, the computer-readable program code portions include an executable portion configured to cause a transmission of one or more honey-pot communications to be provided to the end-point device with the one or more honey-pot communications being requests for information relating to at least one of the end-point device or the user associated with the end-point device. In various embodiments, the computer-readable program code portions include an executable portion configured to update a synthetic machine learning model configured to determine the synthetic likelihood value of communications based on one or more responses to the one or more honey-pot communications.

In various embodiments, the computer-readable program code portions include an executable portion configured to cause one or more additional security actions to be required to access the one or more accounts associated with the user in an instance in which the synthetic likelihood value is above a synthetic threshold. In various embodiments, the first reply communication is generated using artificial intelligence based on the first account communication.

In still another example embodiment, a computer-implemented method for detecting synthetic activity in a network via use of interactive artificial intelligence is provided. The method includes receiving a first account communication from an end-point device. The first account communication is associated with a user. The method also includes causing a transmission of a first reply communication to be provided to the end-point device based on the first account communication. The method further includes receiving a second account communication from the end-point device. The method still further includes determining a synthetic likelihood value based on at least one of the first account communication or the second account communication. The synthetic likelihood value indicates the likelihood that at least one of the first account communication or second account communication are synthetic. The method also includes causing a restriction in access to one or more accounts associated with the user in an instance in which the synthetic likelihood value is above a synthetic threshold.

In various embodiments, the method also includes determining a malfeasance value based on at least one of the first account communication or the second account communication with the malfeasance value indicating the likelihood that at least one of the first account communication or the second account communication are being received from a malfeasant actor; and causing a transmission of one or more additional reply communications to be provided to the end-point device in an instance in which the malfeasance value is above a malfeasance threshold with each of the one or more additional reply communications including a request for information relating to the user.

In various embodiments, the malfeasance value is determined based on a comparison of known user information to user information provided in at least one of the first account communication or the second account communication.

In various embodiments, the method also includes causing a transmission of one or more honey-pot communications to be provided to the end-point device with the one or more honey-pot communications being requests for information relating to at least one of the end-point device or the user associated with the end-point device. In various embodiments, the method also includes updating a synthetic machine learning model configured to determine the synthetic likelihood value of communications based on one or more responses to the one or more honey-pot communications.

In various embodiments, the method also includes causing one or more additional security actions to be required to access the one or more accounts associated with the user in an instance in which the synthetic likelihood value is above a synthetic threshold. In various embodiments, the first reply communication is generated using artificial intelligence based on the first account communication.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 3 illustrates a process flow for detecting synthetic activity in a network via use of interactive artificial intelligence, in accordance with various embodiments of the present disclosure.

DETAILED DESCRIPTION

Figure 1A:
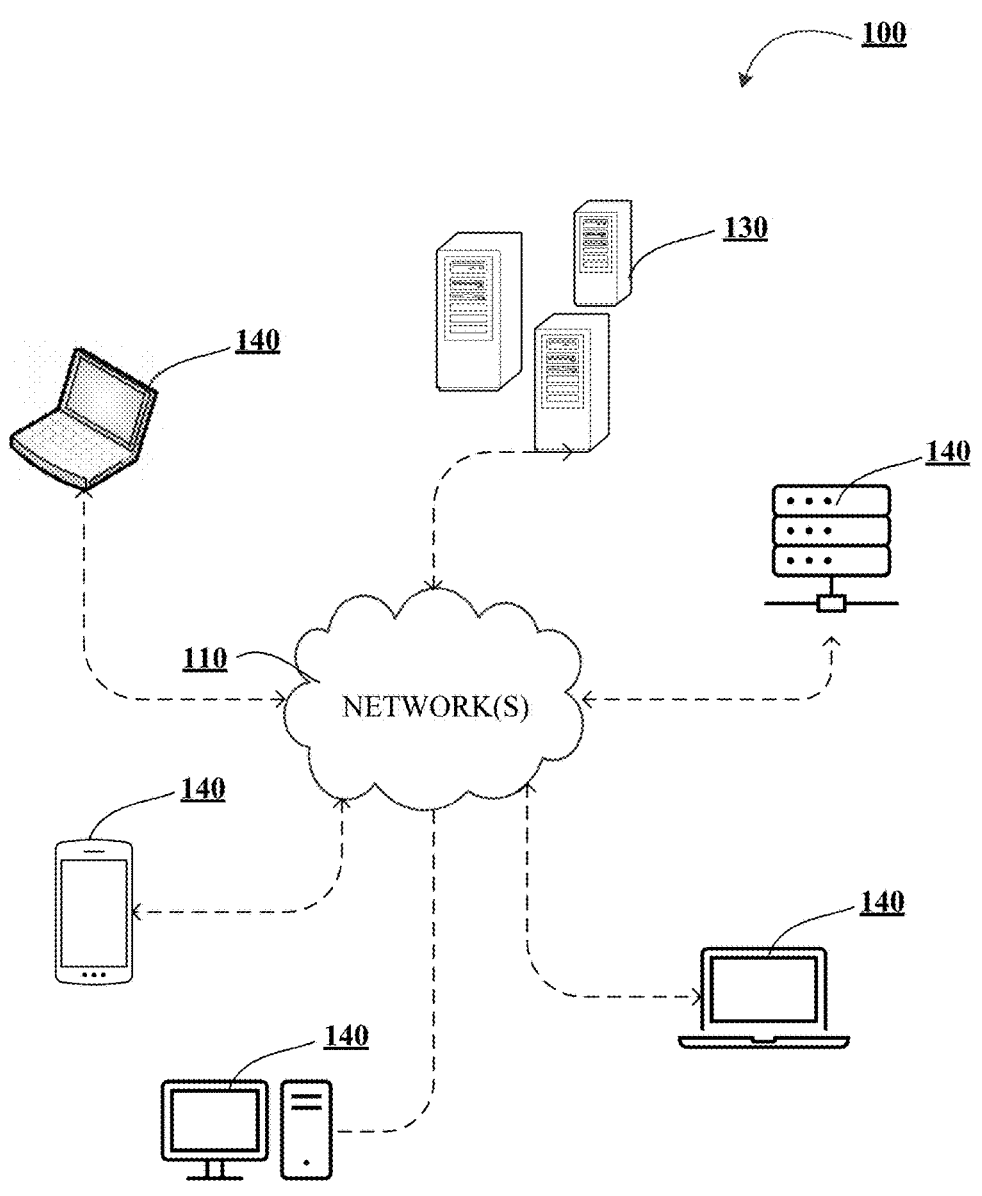
FIGS. 1A-1C illustrates technical components of an exemplary distributed computing environment for detecting synthetic activity in a network via use of interactive artificial intelligence, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Synthetic activity can be difficult to detect as synthetic technology has improved in ability to mimic human voice and/or language. Additionally, malfeasant activity by malfeasant actors have become harder to detect as malfeasant actors have greater access to misappropriated user information. However, customers still expect to receive a similar customer experience that does not require long waits, extended questioning, and/or the like. As such, there is a lack of security in real-time communications due to a lack of monitoring for synthetic activity and/or malfeasant activity.

Various embodiments of the present disclosure allow for real-time monitoring of communications for synthetic and malfeasant activity.

Various embodiments of the present disclosure allow for detection of synthetic activity in a network via use of interactive artificial intelligence. The system can be used for verbal and/or textual communications. Upon receiving a first account communication from an end-point device (e.g., a mobile phone) alleging to be associated with a user, the system generates a first reply communication to be provided to the end-point device based on the first account communication. Upon receiving a second account communication (e.g., a response to the first reply communication), the system determines a likelihood that the communications from the end-point device alleging to be associated with the user is synthetic. In an instance in which the communications are determined to be potentially synthetic, the system may cause a restriction to access for the end-point device and/or the user until the issue is resolved.

Additionally, the system also can monitor for malfeasant activity, by comparing the communications from the end-point device alleging to be the user to information relating to the user and/or known malfeasant actors. For example, the system may compare user information (e.g., name, birthdate, passwords, security question answers, etc.) provided in the communications to known user information stored for the user. Additionally or alternatively, the system may compare the communication to known malfeasant communications (e.g., malfeasant actors may repeat similar actions during malfeasant activity). The system of various embodiments can determine synthetic and/or malfeasant activity in real-time or near real-time to allow for communications to be carried out safely (e.g., a customer service representative can assist a user with lower chance of malfeasant activity without delaying the assistance).

Figure 1B:
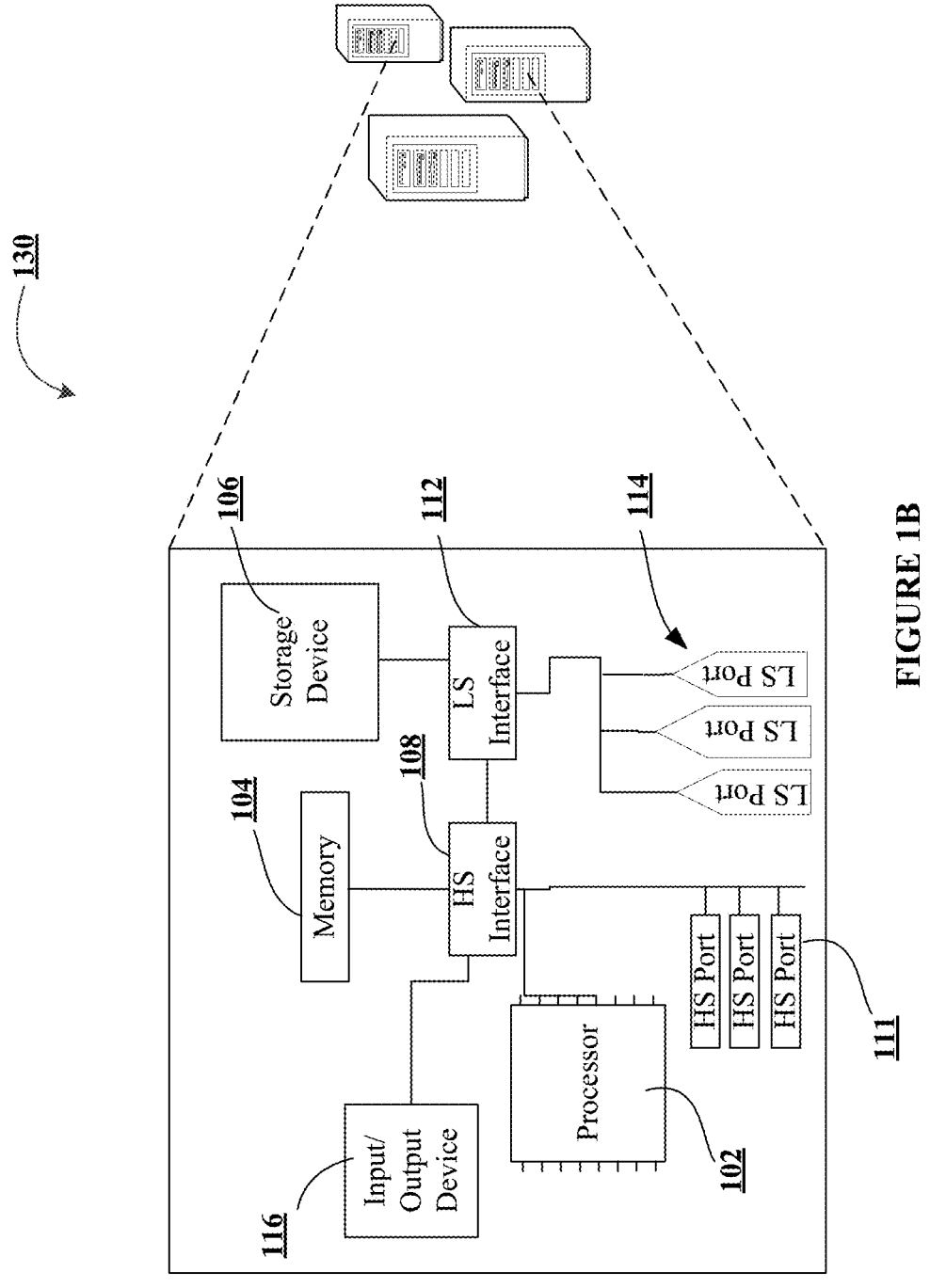
Figure 1C:
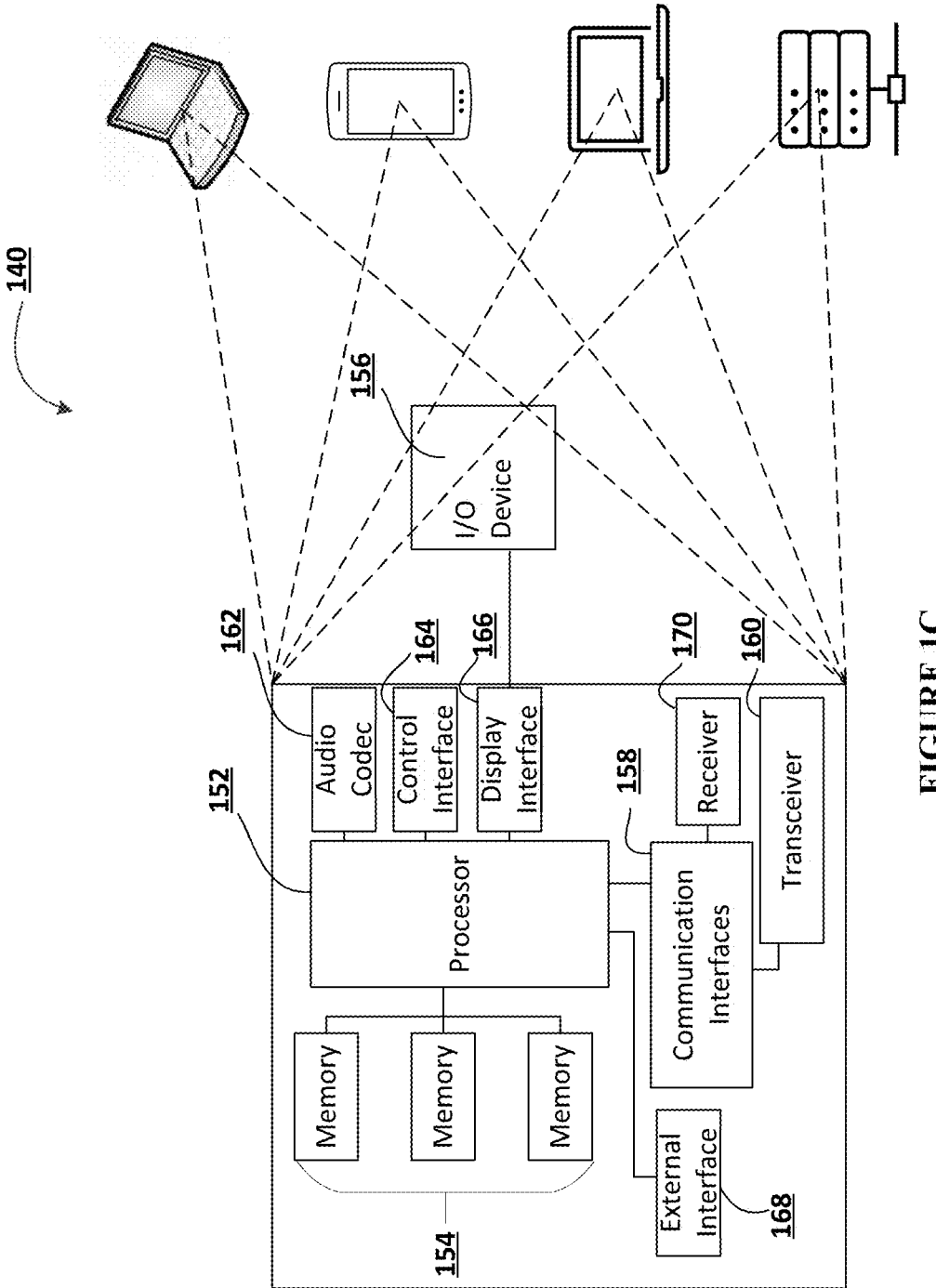

FIGS. 1A-1C illustrate technical components of an exemplary distributed computing environment for detecting synthetic activity in a network via use of interactive artificial intelligence, in accordance with various embodiments of the disclosure. As shown in FIG. 1A, the distributed computing environment 100 contemplated herein may include a system 130 (e.g., a malfeasant activity detection device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
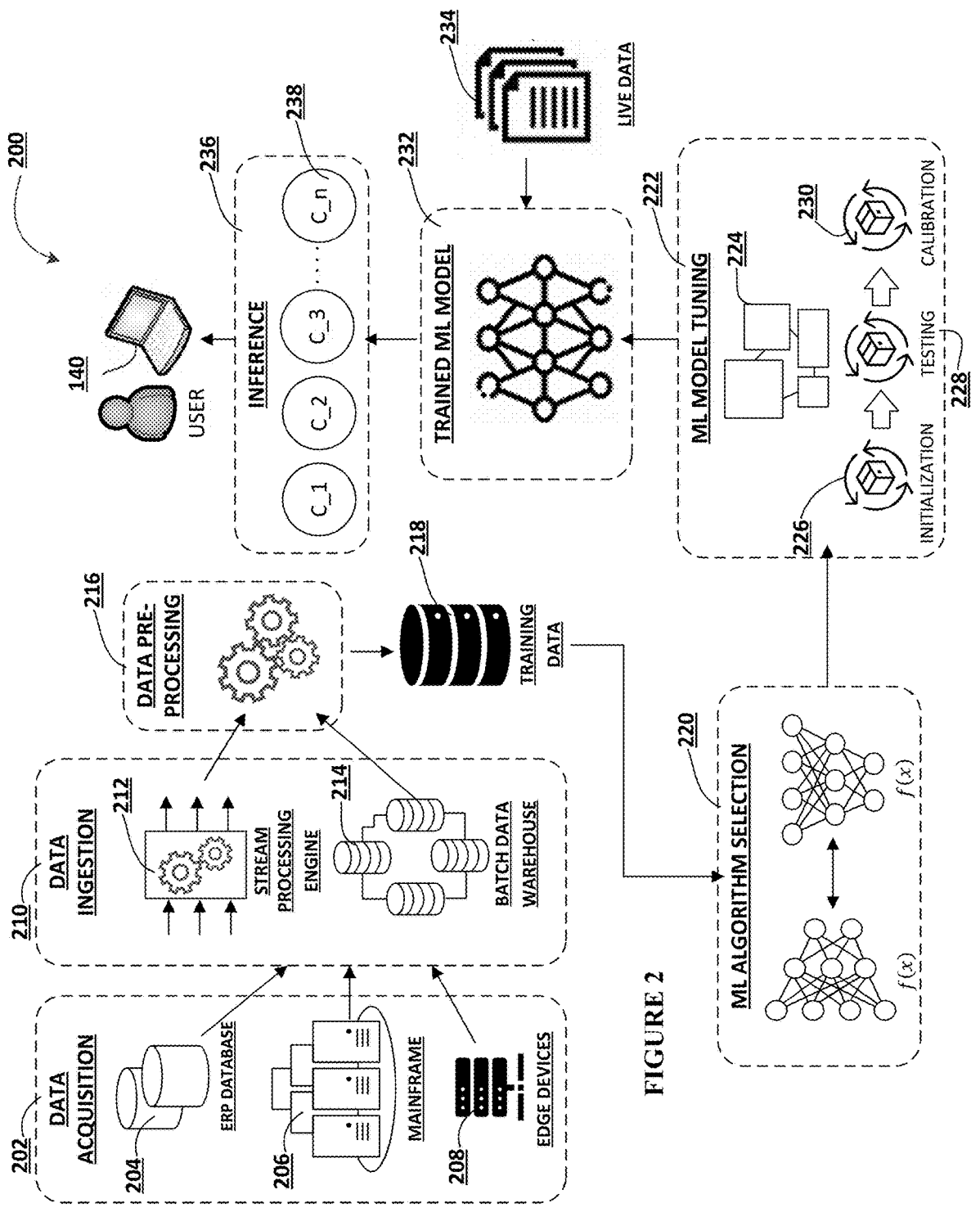
FIG. 2 illustrates an example machine learning (ML) subsystem architecture used to detecting synthetic activity in a network via use of interactive artificial intelligence, in accordance with various embodiments of the present disclosure.

FIG. 2 illustrates an example machine learning (ML) subsystem architecture 200, in accordance with an embodiment of the present disclosure. The ML subsystem architecture may be part of the components of the environment 100 (e.g., system 130). The ML subsystem architecture is used to detect and prevent malfeasant activity as discussed below in reference to FIG. 3. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

FIG. 3 is a flow chart 300 that illustrates an example method of detecting synthetic activity in a network via use of interactive artificial intelligence. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to optional Block 302 of FIG. 3, the method includes training a synthetic machine learning model to detect potentially synthetic activity. The machine learning model execution may be carried out by the ML subsystem architecture 200. The synthetic machine learning model may include one or more models to process and/or analyze data. The synthetic machine learning model may include natural language processing (NLP) and/or artificial intelligence. For example, the system may use the NLP model to scan information provided to the synthetic machine learning model to identify recurring patterns relating to malfeasant activity. The synthetic machine learning model may be trained using historical data for the user and/or similar users. The trained machine learning model may be used in various operations discussed herein.

The synthetic machine learning model may be trained using historical data and/or simulated data. For example, the synthetic machine learning model may be trained using data relating to previous conversations with a user (e.g., conversations may be recorded to be used to compare the vocal characteristics of the user to the vocal characteristics of the alleged user discussed herein) and/or the synthetic machine learning model may be trained using data generated based on known synthetic activity (e.g., some operations are known to be an indication of synthetic activity, such as a synthetic voice not needing to exhale like a live person). The trained synthetic machine learning model may be used for the operations discussed herein (e.g., the synthetic machine learning model may be used to determine the synthetic likelihood value and/or the synthetic threshold). The synthetic machine learning model may also be used to determine the malfeasance value and/or the malfeasance threshold.

Referring now to Block 304 of FIG. 3, the method includes receiving a first account communication from an end-point device. The first account communication is associated with a user. The first account communication may be associated with the user based on actual connection (e.g., a registered end-point device, verified information, etc.) and/or a stated connection (e.g., the user may claim to be the user and/or a representation of the user). The first account communication and subsequent account communication(s) and reply communication(s) may be part of a conversation, verbal and/or textual, between an alleged user and a representative of an entity (e.g., either real or automated). For example, the communications discussed herein may be part of a phone call or chat for customer services. As such, the conversation may include the alleged user claiming an association with the user (e.g., via personal information (e.g., name, birthdate, account information, etc.)).

The first account communication may be transmitted via and/or generated by the end-point device. For example, in an instance in which a user is non-synthetic, the user may input the first account communication (e.g., talk into a phone and/or type out a message) into the end-point device, which transmit the first account communication via the network as discussed herein. Alternatively, in an instance in which the first account communication is synthetic (e.g., non-human generated), an end-point device (or other connected processing device) may generate the first account communication to mimic a user and the end-point device transmits the generated first account communication. While the first account communication is referred to as a first account communication, it need not be the first communication from the end-point device.

Referring now to Block 306 of FIG. 3, the method includes causing a transmission of a first reply communication to be provided to the end-point device based on the first account communication. The first reply communication may be an automated response to the first account communication (e.g., an AI chatbot may provide a response, either verbal and/or textual, to the end-point device). In various embodiment, the first reply communication may be provided to an entity user (e.g., a customer service representative) to provide as a response to the first account communication (e.g., the entity user may have an entity end-point device that renders a user interface that provides the first reply communication to the entity user to relay to the end-point device associated with the first account communication).

The first reply communication may be based on the first account communication, such that at least a portion of the first reply communication uses information from the first account communication to determine the first reply communication. The information from the first account communication used to generate the first reply communication may include, for example, user information (e.g., username, personal information, account information, etc.), communication characteristics (e.g., certain communication characteristics may indicate synthetic activity, which may cause the system to ask more specific questions in the first reply communication), end-point device information (e.g., the first account communication may include metadata, such as origination location, which can be used to generate the first reply communication), and/or the like.

In various embodiments, the first reply communication may be generated using artificial intelligence (e.g., AI may generate the first reply communication based on the first account communication). The first reply communication may be based on the user associated with the first account communication. For example, the first account communication may provide information that alleges that the first account communication and the system may use information stored about the user to generate a first reply communication (e.g., the system may prompt the user with one of the security questions for the user or a request for personal information for the user).

Referring now to Block 308 of FIG. 3, the method includes receiving a second account communication from the end-point device. The second account communication may be in the same form as the first account communication (e.g., as a part of a verbal and/or textual conversation). The second account communication may be a response to the first reply communication. For example, the second account communication may be a response to a request made in the first reply communication. In various embodiments, the second account communication need not necessarily be the next communication from the end-point device after the first reply communication (e.g., the entity user and the end-point device may have an intermediate conversation and such intermediate conversations may also be used in determining the synthetic likelihood value and/or the malfeasant value).

Referring now to Block 310 of FIG. 3, the method includes determining a synthetic likelihood value based on at least one of the first account communication or the second account communication. The synthetic likelihood value may be based on the content of the first account communication and/or the second account communication. For example, the information provided in the first account communication and/or the second account communication may be compared to information known about the user from stored account information and/or previous conversations.

Additionally or alternative, the communication characteristics of the first account communication and/or the second account communication may be analyzed to determine the synthetic likelihood value. Communication characteristics of the first account communication and/or the second account communication may include the cadence of speech (e.g., in a verbal communication), the speed of response (e.g., in either verbal or textual communication), the liveness of the first account communication and/or the second account communication (e.g., did the communications include breaks to allow a real person to exhale), and/or various other characteristics. The communication characteristics may be compared to known communication for real people (e.g., real people may have certain types of communication characteristics), the specific user (e.g., the communication characteristics of the communications may be compared to communication characteristics of the user in previous conversations), and/or synthetic activity (e.g., the communication characteristics may be compared to the communication of previous synthetic activity).

The synthetic likelihood value is compared to a synthetic threshold to determine whether potential synthetic activity is present in the first account communication and/or the second account communication. The synthetic threshold may be set based on the desired level of security. For example, the lower the synthetic threshold, the more likely a communication may be tagged as synthetic. In such an example, more communications may be tagged as synthetic activity, which increases security, but also more false positives (e.g., communications tagged as synthetic activity that are not synthetic activity). As such, the synthetic threshold may be based on the desired security level. In various embodiments, the synthetic threshold may be different based on the attempted activity. For example, a user attempting to withdraw money from an account may have a lower synthetic threshold than an alleged user attempting to move money between accounts associated with the user.

In various embodiments, an initial synthetic likelihood value may be determined based on the first account communication. For example, the system may analyze the first account communication before generating the first reply communication. In various embodiments, the first reply communication may be generated based on the initial synthetic likelihood value. For example, in an instance in which the initial synthetic likelihood value indicates that the first account communication is synthetic (e.g., the initial synthetic likelihood value is above the synthetic threshold), the system may generate a first reply communication that requests specific information relating to whether the communications are synthetic (e.g., the first reply communication may include a request to provide a response only known to the user).

Referring now to Block 312 of FIG. 3, the method includes causing a restriction in access to one or more accounts associated with the user in an instance in which the synthetic likelihood value is above a synthetic threshold. The synthetic likelihood value being above the synthetic threshold indicates potential synthetic activity. In various embodiments, the restriction in access to the one or more accounts associated with the user may be any delay or restriction on account capabilities. For example, the account may be locked, require additional authentication, require a waiting period of action execution, etc.

In various embodiments, the restriction in access to one or more accounts associated with the user may be time-based. For example, an account associated with the user may be locked from withdrawals for a predetermined amount of time. In various embodiments, the restriction may be the length of the communication (e.g., the account may be accessible for a user once the communication with the synthetic actor is completed).

In various embodiments, the restriction in access to one or more accounts associated with the user may be lifted upon completion of additional security actions to prove the communication is not synthetic activity. For example, the system may prompt a user to complete additional authentication (e.g., multi-factor authentication, alternative login information, additional personal information, etc.) before ending the restriction on the one or more accounts associated with the user.

In various embodiments, the system may generate a synthetic activity indicator that is provided to an entity user (e.g., a representative speaking/chatting with the end-point device alleging to be the user) that indicates that synthetic activity may be likely. In various embodiments, the synthetic activity indicator may include a likelihood of synthetic activity (e.g., "There is an 80% chance that the chat is synthetic"). Additionally or alternatively, the synthetic activity indicator may be a warning of potential synthetic activity. In some instances, the synthetic activity indicator may be accompanied by account restrictions (e.g., the accounts associated with the user may be limited and an entity user may not be able to perform any actions on the accounts). In various embodiments, in an instance in which the entity user has a user interface (e.g., an entity user may have a dashboard in which the entity user is able to access account information for users to assist with phone and/or chat support), the synthetic activity indicator may be shown on at least a portion of the user interface. For example, the synthetic activity indicator may be a pop-up or otherwise visible warning. In various embodiments, the user interface may be provided with other information relating to the conversation (e.g., a malfeasant activity indicator similar to the synthetic activity indicator may be displayed in an instance in which the malfeasance value is above a malfeasance threshold (as discussed below in reference to optional Blocks 314 and 316 of FIG. 3 below).

In an instance in which the synthetic likelihood value is below the synthetic threshold, the system may cause an execution of one or more actions based on the first account communication, the second account communication, and/or additional account communications from the end-point device. For example, the account(s) associated with a user may not be restricted and normal allowed actions may be completed as usual. Additionally, the entity user may be provided with a confirmation that no potential synthetic activity (and/or malfeasant activity in various embodiments) was discovered.

In various embodiments, the system may also monitor for malfeasant activity in addition to synthetic activity. As such, the system may perform the malfeasant analysis (e.g., shown in Blocks 312-314) before executing any actions based on the first account communication, the second account communication, and/or additional account communications from the end-point device (e.g., only actions from communications that are determined to be non-malfeasant and non-synthetic may be processed).

Referring now to Block 314 of FIG. 3, the method includes determining a malfeasance value based on at least one of the first account communication or the second account communication. The malfeasance value indicates the likelihood that the first account communication and/or the second account communication is being received from a malfeasant actor. A malfeasant actor may be any actor, synthetic and/or real, that is not authorized or otherwise allowed to represent the user (e.g., the malfeasant actor may be impersonating the user).

In various embodiments, the malfeasance value may be determined based on a comparison of known user information to user information provided in at least one of the first account communication or the second account communication. For example, the entity may store user information relating to a user (e.g., personal information, account information, security questions and answers, etc.) that can be accessed to compare to responses provided by the alleged user.

In various embodiments, the first reply communication (or subsequent reply communications) may request user information to compare to the known user information. For example, the first reply communication may include a request for user information (e.g., a password or other personal information) and the second account communication may include a response to said request, In such an example, the response to the request for user information may be compared to known user information and the malfeasance value may be adjusted based on the comparison (e.g., in an instance in which the user information provided in the second account communication matches the known user information, the malfeasance value may decrease (e.g., indicating a lower likelihood of malfeasant activity).

In various embodiments, additional reply communications may request additional information from the end-point device. In such an instance, multiple correct responses (responses that match the known user information) from the end-point device may reduce the malfeasance value more (e.g., a malfeasant actor may know or guess one or two responses correctly, but the more correct responses, the more likely that the alleged user is actually the user). The malfeasance value may be updated based on each communication received from the end-point device.

Additionally or alternatively, the malfeasance value may be determined based on a comparison of known malfeasant activity to information provided by the first account communication and/or the second account communication. Communication characteristics from prior malfeasant activity may be stored and used to compare to the communication characteristics of various communications to determine whether the communications are similar to the prior malfeasant activity. Example of communication characteristics of prior malfeasant activity may include the cadence of voice or text inputs, the sequence and/or type of communications, the type of requests made (e.g., malfeasant actors may make similar withdrawal requests), and/or the like.

In various embodiments, the determination of a malfeasance value may be done prior to, in parallel with, or subsequent to the determination of a synthetic value. In various embodiments, the malfeasance value may be determined subsequent to the determination of the synthetic value. As such, the malfeasance value may not be determined in an instance in which the system determines that the communication(s) are synthetic (e.g., the system may assume that any synthetic activity is to be considered malfeasant and therefore, the determination that the communication(s) are synthetic can be used in place of the malfeasance value to determine potential malfeasance).

Referring now to optional Block 316 of FIG. 3, the method includes causing a transmission of one or more additional reply communications to be provided to the end-point device in an instance in which the malfeasance value is above a malfeasance threshold. Upon determining potentially malfeasant activity (e.g., the malfeasance value is above a malfeasance threshold), the system may be request additional information from the end-point device via the one or more additional reply communications. The additional information received in response to the additional reply communications may either confirm or refute the malfeasance activity determination (e.g., the reply communication may request additional authentication to confirm the malfeasant activity determination).

The one or more additional reply communications may be used to fatigue a malfeasant actor. For example, the one or more additional reply communications may cause a malfeasant actor to determine that the malfeasant activity is not worth the time and/or effort required. Examples of one or more additional reply communications used to fatigue a malfeasant actor may include requesting the same information multiple times, requests for large amounts of personal information that a malfeasant actor may not know offhand, redirecting the communications to unintended topics (e.g., a malfeasant actor that has requested a withdrawal of funds may be prompted to indicate the account in which a deposit is desired), and/or other communications that extend the communications without the malfeasant actor achieving any malfeasant activity.

Referring now to optional Block 318 of FIG. 3, the method includes causing a transmission of one or more honey-pot communications to be provided to the end-point device. The one or more honey-pot communications may be requests for information relating to at least one of the end-point device or the user associated with the end-point device. The one or more honey-pot communications may be in response to a determination of potential synthetic activity (e.g., the synthetic likelihood value is above the synthetic threshold) and/or potential malfeasant activity (e.g., the malfeasance value is above the malfeasance threshold).

The one or more honey-pot communications may be intended to extract additional information from the synthetic and/or malfeasant actor. Such information may be used to teach and/or otherwise update the synthetic machine learning model and/or other machine learning models discussed herein. For example, the communication characteristics may be compared to future communication characteristics to determine future synthetic and/or malfeasant activity.

In various embodiments, the system may have a honey-pot database (e.g., within memory 104 and/or storage device 106 of the entity system 130. The honey-pot database may store the information gathered herein and use said data for future iterations (e.g., by training the machine learning models and/or otherwise). Each account communication response received in response to a honey-pot communication may be tagged as synthetic and/or malfeasant to be used for future analysis (e.g., known synthetic activity may be compared to communications to determine potential synthetic activity).

Referring now to optional Block 320 of FIG. 3, the method includes updating the synthetic machine learning model configured to determine the synthetic likelihood value of communications based on one or more responses to the honey-pot communication(s). The synthetic machine learning model may be updated as discussed above in reference to FIG. 2. The synthetic machine learning model may be updated in the same fashion as the initial training. The synthetic machine learning model may be constantly and/or periodically updated to maintain accurate performance.

As discussed herein, the synthetic machine learning model may be updated using any of the communications discussed herein (e.g., the first account communications, the second account communications, etc. that are marked as potentially synthetic and/or malfeasant may be used to update the machine learning model). In various embodiments, the update to the synthetic machine learning model may include manually review of the communications and designations (e.g., the communications marked as synthetic and/or malfeasant may be reviewed to determine whether the designation was correct, and the synthetic machine learning model may be updated as such).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for detecting synthetic activity in a network via use of interactive artificial intelligence, the system comprising:

at least one non-transitory storage device containing instructions; and at least one processing device coupled to the at least one non-transitory storage device, wherein the at least one processing device, upon execution of the instructions, is configured to:

receive a first account communication from an end-point device, wherein the first account communication is associated with a user;

based on the first account communication, cause a transmission of a first reply communication to be provided to the end-point device;

receive a second account communication from the end-point device;

based on at least one of the first account communication or the second account communication, determine a synthetic likelihood value via a synthetic machine learning model, wherein the synthetic likelihood value indicates a likelihood that at least one of the first account communication or the second account communication are synthetic;

in an instance in which the synthetic likelihood value is above a synthetic threshold, cause a restriction in access to one or more accounts associated with the user, wherein the restriction in access comprises required additional authentication displayed on the end-point device and a waiting period of action execution;

transmit one or more honey-pot communications to the end-point device, wherein the one or more honey-pot communications are requests for information relating to at least one of the end-point device or the user associated with the end-point device;

transmit multiple additional reply communications after the one or more honey-pot communications directed to unintended topics for fatigue of a synthetic communication; and update the synthetic machine learning model configured to determine the synthetic likelihood value of communications based on one or more responses to the one or more honey-pot communications.

2. The system of claim 1, wherein the at least one processing device, upon execution of the instructions, is configured to:

based on at least one of the first account communication or the second account communication, determine a malfeasance value, wherein the malfeasance value indicates the likelihood that at least one of the first account communication or the second account communication are being received from a malfeasant actor; and in an instance in which the malfeasance value is above a malfeasance threshold, cause a transmission of one or more additional reply communications to be provided to the end-point device, wherein each of the one or more additional reply communications comprises a request for information relating to the user.

3. The system of claim 2, wherein the malfeasance value is determined based on a comparison of known user information to user information provided in at least one of the first account communication or the second account communication.

4. The system of claim 1, wherein the at least one processing device, upon execution of the instructions, is configured to cause one or more additional security actions to be required to access the one or more accounts associated with the user in an instance in which the synthetic likelihood value is above the synthetic threshold.

5. The system of claim 1, wherein the first reply communication is generated using artificial intelligence based on the first account communication.

6. A computer program product for detecting synthetic activity in a network via use of interactive artificial intelligence, the computer program product comprising at least one non-transitory computer-readable medium having computer-readable program code portions embodied therein, the computer-readable program code portions comprising:

an executable portion configured to receive a first account communication from an end-point device, wherein the first account communication is associated with a user;

an executable portion configured to cause a transmission of a first reply communication based on the first account communication to be provided to the end-point device;

an executable portion configured to receive a second account communication from the end-point device;

an executable portion configured to determine a synthetic likelihood value via a synthetic machine learning model, wherein the synthetic likelihood value indicates a likelihood that at least one of the first account communication or the second account communication are synthetic;

an executable portion configured to cause a restriction in access to one or more accounts associated with the user in an instance in which the synthetic likelihood value is above a synthetic threshold, wherein the restriction in access comprises required additional authentication displayed on the end-point device and a waiting period of action execution;

an executable portion configured to transmit one or more honey-pot communications to the end-point device, wherein the one or more honey-pot communications are requests for information relating to at least one of the end-point device or the user associated with the end-point device;

an executable portion configured to transmit multiple additional reply communications after the one or more honey-pot communications directed to unintended topics for fatigue of a synthetic communication; and an executable portion configured to update the synthetic machine learning model configured to determine the synthetic likelihood value of communications based on one or more responses to the one or more honey-pot communications.

7. The computer program product of claim 6, wherein the computer program product further comprises:

an executable portion configured to determine a malfeasance value based on at least one of the first account communication or the second account communication, wherein the malfeasance value indicates the likelihood that at least one of the first account communication or the second account communication are being received from a malfeasant actor; and an executable portion configured to cause a transmission of one or more additional reply communications to be provided to the end-point device in an instance in which the malfeasance value is above a malfeasance threshold, wherein each of the one or more additional reply communications comprises a request for information relating to the user.

8. The computer program product of claim 7, wherein the malfeasance value is determined based on a comparison of known user information to user information provided in at least one of the first account communication or the second account communication.

9. The computer program product of claim 6, wherein the computer program product further comprises an executable portion configured to cause one or more additional security actions to be required to access the one or more accounts associated with the user in an instance in which the synthetic likelihood value is above the synthetic threshold.

10. The computer program product of claim 6, wherein the first reply communication is generated using artificial intelligence based on the first account communication.

* * * * *